(12) United States Patent
Nimbalker et al.

(10) Patent No.: US 12,015,478 B2
(45) Date of Patent: Jun. 18, 2024

(54) DEFINING A CONDITION BASED ON A REFERENCE TIME INTERVAL

(71) Applicant: Telefonaktiebolaget LM Ericsson (publ), Stockholm (SE)

(72) Inventors: Ajit Nimbalker, Fremont, CA (US); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 501 days.

(21) Appl. No.: 17/283,609

(22) PCT Filed: Oct. 8, 2019

(86) PCT No.: PCT/SE2019/050979
§ 371 (c)(1),
(2) Date: Apr. 8, 2021

(87) PCT Pub. No.: WO2020/076226
PCT Pub. Date: Apr. 16, 2020

(65) Prior Publication Data
US 2021/0351861 A1 Nov. 11, 2021

Related U.S. Application Data

(60) Provisional application No. 62/742,528, filed on Oct. 8, 2018.

(51) Int. Cl.
*H04L 1/00* (2006.01)
*H04L 5/00* (2006.01)
*H04L 27/26* (2006.01)

(52) U.S. Cl.
CPC .......... *H04L 1/0005* (2013.01); *H04L 1/0016* (2013.01); *H04L 5/0046* (2013.01); *H04L 27/26025* (2021.01)

(58) Field of Classification Search
None
See application file for complete search history.

(56) References Cited

U.S. PATENT DOCUMENTS

2012/0287883 A1 11/2012 Sabella et al.
2015/0016553 A1 1/2015 Yang et al.
(Continued)

FOREIGN PATENT DOCUMENTS

WO 2016167908 A1 10/2016
WO WO-2019217718 A1 * 11/2019 ........ H03M 13/1102

OTHER PUBLICATIONS

3GPP TSG RAN WG1 Meeting NR#4 R1-1800345; Title: On UE peak data rate; Agenda Item: 7.9; Source: Intel Corporation; Document for: Discussion/Decision; Date and Location: Jan. 22-26, 2018, Vancouver, Canada, consisting of 4-pages.
(Continued)

Primary Examiner — Walter J Divito
(74) Attorney, Agent, or Firm — Weisberg I.P. Law, P.A.

(57) ABSTRACT

A method performed by a network entity in which the method includes transmitting or receiving a transmission of data, wherein the transmission is scheduled with a Modulation and Coding Scheme, MCS, level indicated by an MCS index, $I_{MCS}$, and wherein the transmitting or receiving is based on a first condition being used for a first subset of MCS levels being a subset of all possible MCS levels.

24 Claims, 7 Drawing Sheets

(56) References Cited

U.S. PATENT DOCUMENTS

| | | |
|---|---|---|
| 2015/0036590 A1 | 2/2015 | Lahetkangas et al. |
| 2015/0195818 A1 | 7/2015 | Davydov et al. |
| 2015/0195819 A1 | 7/2015 | Kwon et al. |
| 2015/0215913 A1 | 7/2015 | Cheng et al. |
| 2015/0372784 A1 | 12/2015 | Xu et al. |
| 2016/0094310 A1 | 3/2016 | Xia |

OTHER PUBLICATIONS

International Search Report and Written Opinion dated Jan. 15, 2020 for International Application No. PCT/SE2019/050979 filed Oct. 8, 2019, consisting of 11-pages.
3GPP TS 38.214 V15.3.0; 3rd Generation Partnership Project; Technical Specification Group Radio Access Network; NR; Physical layer procedures for data (Release 15), Sep. 2018, consisting of 96-pages.
3GPP TSG-RAN WG1 Meeting #94b R1-1812063; Title: Summary of Soft buffer and Peak rate; Agenda Item: 7.1.3.3; Source: Ericsson; Document for: Discussion and Decision; Date and Location: Oct. 8-12, 2018, Chengdu, consisting of 7-pages.
3GPP TSG-RAN WG1 Meeting #94bis R1-1811236; Title: Maintenance for DL/UL data scheduling and HARQ procedure; Agenda Item: 7.1.3.3; Source: Qualcomm Incorporated; Document for: Discussion/Decision; Date and Location: Oct. 8-12, 2018, Chengdu, China, consisting of 16-pages.
Colombian Office Action and English translation dated Nov. 22, 2023 for Application No. NC2021/0005609, consisting of 14 pages.
ETSI TS 138 214 V15.2.0; 5G; NR; Physical layer procedures for data; (3GPP TS 38.214 version 15.2.0 Release 15); Jul. 2018, consisting of 95 pages.

* cited by examiner

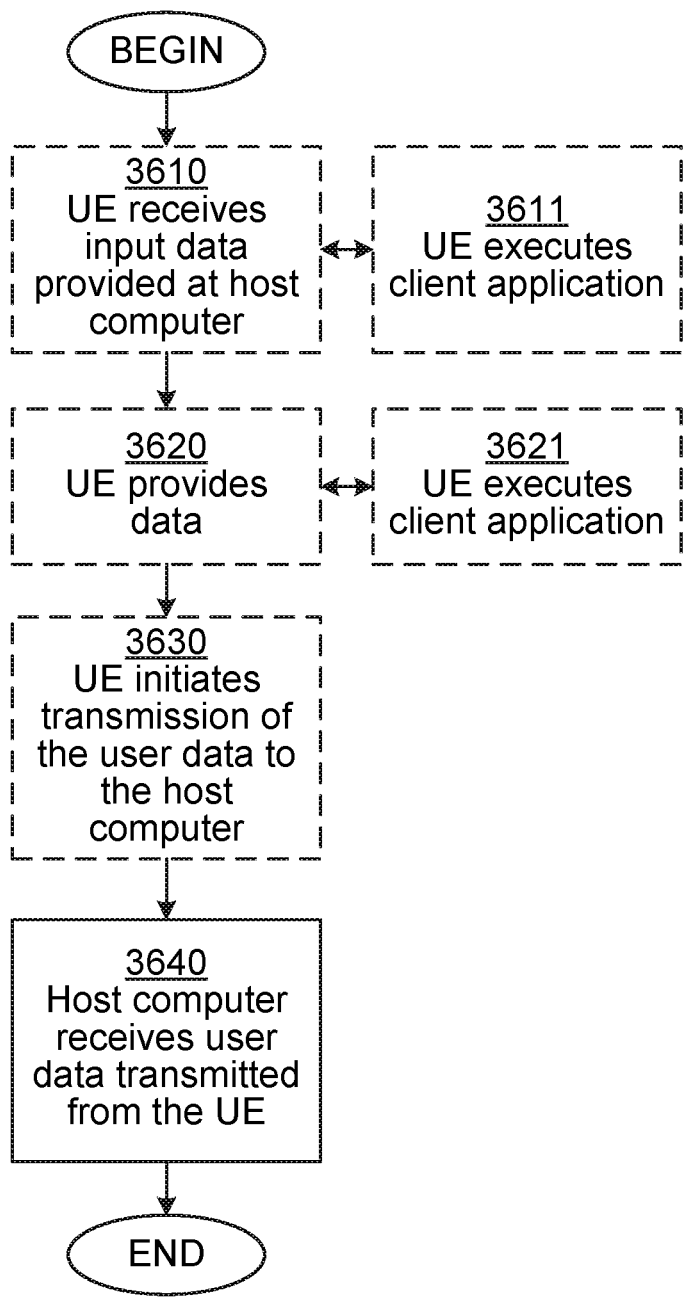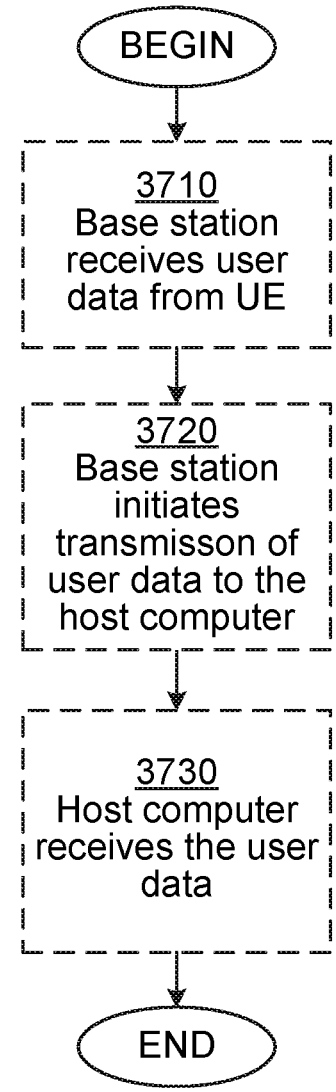
Fig. 11
Fig. 12

DEFINING A CONDITION BASED ON A REFERENCE TIME INTERVAL

CROSS-REFERENCE TO RELATED APPLICATIONS

This application is a Submission Under 35 U.S.C. § 371 for U.S. National Stage Patent Application of International Application No.: PCT/SE2019/050979, filed Oct. 8, 2019 entitled "DEFINING A CONDITION BASED ON A REFERENCE TIME INTERVAL," which claims priority to U.S. Provisional Application No. 62/742,528, filed Oct. 8, 2018, the entireties of both of which are incorporated herein by reference.

TECHNICAL FIELD

The invention relates to defining a condition to be satisfied for reference number of information bits based on a reference time interval.

BACKGROUND

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot may consist of any number of 1 to 14 OFDM (orthogonal frequency-division multiplexing) symbols. It should be noted that the concepts of slot and mini-slot are not specific to a specific service meaning that a mini-slot may be used for either eMBB, URLLC, or other services.

Unlike LTE (Long Term Evolution), NR transmission duration for a packet, processing times, transmission bandwidths are quite flexible, and therefore, how to define the peak data rate and its implications on scheduling decisions (e.g. transport block size) are not clearly defined. There is a need to design solutions that can reflect reasonably well the impact of peak data rate on scheduling decisions such as transport block size.

SUMMARY

It is an object to improve how excessive data rates are identified.

According to a first aspect, it is provided a method performed by a network entity, the method comprising: transmitting or receiving a transmission of data, wherein the transmission is scheduled with a Modulation and Coding Scheme, MCS, level indicated by an MCS index, $I_{MCS}$, and wherein the transmitting or receiving is based on a first condition being used for a first subset of MCS levels being a subset of all possible MCS levels.

The first subset of MCS levels may consist of those for which an associated target code rate is reserved.

The first subset of MCS levels may correspond to MCS levels associated with a "reserved" label in an MCS index table in section 5.1.3.1 of the 3GPP specification TS 38.214.

The first subset of MCS levels may contain MCS levels with an $I_{MCS}$ being one of 29, 30 or 31 when 64 QAM, Quadrature Amplitude Modulation, is applied.

The network entity may be a user equipment, UE.

The first condition may result in a second restriction of transport block size.

The second restriction of transport block size may be defined by:

scheduledTBS<=DataRate*durationSCH where scheduledTBS is a scheduled transport block size, DataRate is data rate of a carrier and durationSCH is an assigned duration of the downlink or uplink shared channel.

The duration SCH may be calculated according to:

$T_s^\mu \cdot L_j$, where $L_j$ denotes the number of shared channel symbols and $$T_s^\mu = \frac{10^{-3}}{2^\mu \cdot N_{symb}^{slot}},$$

where μ denoted numerology and $N_{symb}^{slot}$ denotes number of symbols per slot.

The data rate may be data rate per component carrier.

The data rate may be derived from UE band/band-combination signaling.

The data rate may include a scaling factor.

A second condition may being used for the second subset may result in a first restriction of transport block size, TBS, applied for a second subset of MCS levels for one or more serving cells.

The second subset can include all MCS levels.

The first restriction may define a peak data rate over which the UE is not required to handle transmissions.

According to a second aspect, it is provided a network entity comprising: a processor; and a memory storing instructions that, when executed by the processor, cause the network entity to: transmit or receive a transmission of data, wherein the transmission is scheduled with a Modulation and Coding Scheme, MCS, level indicated by an MCS index, $I_{MCS}$, and wherein the transmitting or receiving is based on a first condition being used for a first subset of MCS levels being a subset of all possible MCS levels.

The first subset of MCS levels may consist of those for which an associated target code rate is reserved.

The first subset of MCS levels may correspond to MCS levels associated with a "reserved" label in an MCS index table in section 5.1.3.1 of the 3GPP specification TS 38.214.

The first subset of MCS levels may contain MCS levels with an $I_{MCS}$ being one of 29, 30 or 31 when 64 QAM, Quadrature Amplitude Modulation, is applied.

The network entity may be a user equipment, UE.

The first condition may result in a second restriction of transport block size.

The second restriction of transport block size may be defined by:

scheduledTBS<=DataRate*durationSCH where scheduledTBS is a scheduled transport block size, DataRate is data rate of a carrier and durationSCH is an assigned duration of the downlink or uplink shared channel.

The duration SCH may be calculated according to:
$T_s^\mu \cdot L_j$, where $L_j$ denotes the number of shared channel symbols and $$T_s^\mu = \frac{10^{-3}}{2^\mu \cdot N_{symb}^{slot}},$$

where μ denoted numerology and $N_{symb}^{slot}$ denotes number of symbols per slot.

The data rate may be data rate per component carrier.

The data rate may be derived from UE band/band-combination signaling.

The data rate may include a scaling factor.

A second condition being used for the second subset may result in a first restriction of transport block size, TBS, applied for a second subset of MCS levels for one or more serving cells.

The second subset can include all MCS levels.

The first restriction may define a peak data rate over which the UE is not required to handle transmissions.

According to a third aspect, it is provided a computer program comprising computer program code which, when run on a network entity causes the network entity to: transmit or receive a transmission of data, wherein the transmission is scheduled with a Modulation and Coding Scheme, MCS, level indicated by an MCS index, $I_{MCS}$, and wherein the transmitting or receiving is based on a first condition being used for a first subset of MCS levels being a subset of all possible MCS levels.

According to a fourth aspect, it is provided a computer program product comprising a computer program according to the third aspect and a computer readable means on which the computer program is stored.

The embodiments presented herein address the cases where UE (User Equipment) capability signalling can include multiple parameters that together are used for defining an approximate peak data rate, including a scaling factor that can at least take values 1, 0.8, 0.75 and 0.4. This is further addressed for cases including multiple numerologies, multiple carriers with same or different numerologies, dual connectivity cases, etc.

In case of data rate sharing among different carriers (e.g. on downlink or uplink), there can be some cases in scheduling that can cause extreme peak rates on a single carrier, which can be problematic in certain cases, including when the different carriers are capable of processing data rate at different processing timelines.

The embodiments provided herein can accommodate complexity and decoding constraints at the UE while also keeping the scheduler restrictions to a minimum. It also allows efficient support of UEs that can support with different processing timelines on different carriers in CA (Carrier Aggregation) case.

Generally, all terms used are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 11 to 12 are flowcharts illustrating methods implemented in a communication system including a host computer, a base station and a user equipment;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
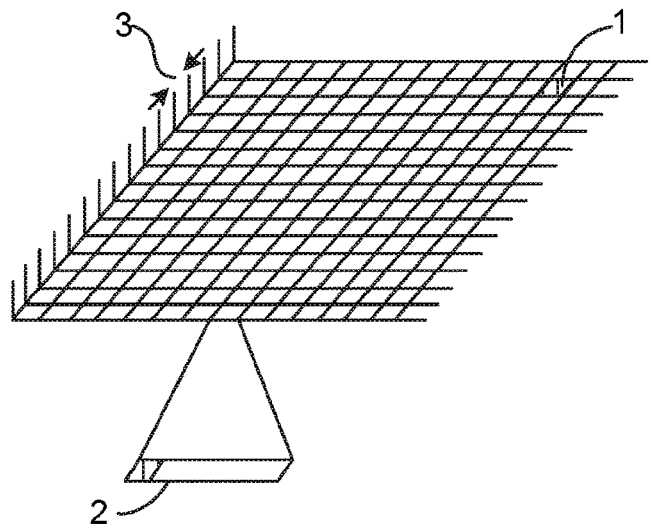
FIG. 1 is a schematic diagram illustrating exemplary radio resource in NR.

FIG. 1 is a schematic diagram illustrating exemplary radio resource in NR. Time is represented along the horizontal axis and frequency is along the tilted vertical axis. Each sub-carrier 3 is here 15 kHz. Each time interval 2 is one OFDM symbol including a cyclic prefix. A resource element 1 is a combination of a sub-carrier 3 and a time interval 2.

The Third Generation Partnership Project 3GPP defines technical specifications for New Radio (NR) (e.g., 5G). In release 15 (Rel-15) NR, a user equipment (UE) can be configured with up to four carrier bandwidth parts (BWPs) in the downlink, with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWPi}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:
  Physical Downlink Shared Channel, PDSCH
  Physical Broadcast Channel, PBCH
  Physical Downlink Control Channel, PDCCH:
  PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:
  Physical Uplink Shared Channel, PUSCH:
  Physical Uplink Control Channel, PUCCH
  Physical Random Access Channel, PRACH
  PUSCH is the uplink counterpart to the PDSCH. PUCCH is used by UEs to transmit uplink control information, including HARQ (Hybrid Automatic Repeat reQuest) acknowledgements, channel state information reports, etc. PRACH is used for random access preamble transmission.

Peak Rate Formula

An example peak rate formula given by the following. For NR, the approximate data rate for a given number of aggregated carriers in a band or band combination is computed as follows.

data rate (in $Mbps$) =

$$10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)})\right)$$

wherein
  J is the number of aggregated component carriers in a band or band combination
  $R_{max}=948/1024$
  For the j-th CC (Component Carrier),
  $v_{Layers}^{(j)}$ is the maximum number of layers
  $Q_m^{(j)}$ is the maximum modulation order
  $f^{(j)}$ is the scaling factor
  The scaling factor can take the values 1, 0.8, 0.75, and 0.4.
  $f^{(j)}$ is signalled per band and per band combination
  $\mu$ is the numerology (as defined in the 3GPP specification TS 38.211)
  $T_s^\mu$ is the average OFDM symbol duration in a subframe for numerology $\mu$, i.e.

$$T_s^\mu = \frac{10^{-3}}{14 \cdot 2^\mu}.$$

Note that normal cyclic prefix is assumed.
  $N_{PRB}^{BW(j),\mu}$ is the maximum RB allocation in bandwidth $BW^{(j)}$ with numerology $\mu$, as defined in section 5.3 of the 3GPP specification TS 38.101-1 and section 5.3 of the 3GPP specification TS 38.101-2, where $BW^{(j)}$ is the UE supported maximum bandwidth in the given band or band combination.
  $OH^{(j)}$ is the overhead and takes the following values:
  [0.14], for frequency range FR1 for DL
  [0.18], for frequency range FR2 for DL
  [0.08], for frequency range FR1 for UL
  [0.10], for frequency range FR2 for UL
  NOTE: Only one of the UL or SUL (Supplementary Uplink) carriers (the one with the higher data rate) is counted for a cell operating SUL.

The approximate maximum data rate can be computed as the maximum of the approximate data rates computed using the above formula for each of the supported band or band combinations.

Related Aspects

Data Rate and Maximum Data Rate

Data rate is an important performance indicator for communication links, and also applies to 5G radio systems. Mobile vendors, mobile operators as well as network vendors typically use peak data rate as a key performance indicator (KPI) and use it for promoting their respective products or solutions. The peak data rate is an indicator of the processing/hardware/software/firmware capabilities from the device perspective, especially the decoder throughput for receiver operations and encoder throughputs for encoding operations. There is a need to take into account the peak rate for utilization on a communication link in a somewhat unambiguous fashion by the physical layer processing functions in a typical network scheduler or in a device.

Typically, data rate can be defined as maximum TBS (Transport Block Size) bits (or information bits) per transmission time interval. Since, both the max TBS bits or the transmission time interval can be variable e.g. in NR, the maximum across all computed data rates can be defined as the maximum data rate or the peak rate. Then, from a TBS perspective, a TB (Transport Block) can be considered decodable by a decoder supporting a throughput of maxDataRate, if the transport block size does not exceed the maxDataRate*transmissionDuration. Note in Code block group based where an initial or a retransmission of transport block comprises only a portion of the transport block bits, the receiver may be expected to perform physical layer decoding of only a portion of the transport block bits and hence that can be a better indicator of the required decoder throughput. In certain scenarios such as LTE-NR dual connectivity, the overall peak data rate offered by a UE can be expressed as sum total of the peak rates obtained from the NR and LTE links operating simultaneously. Since LTE and NR use different encoding/decoding techniques, it is not simple to enable hardware sharing of blocks such as low-density parity-check (LDPC) decode and turbo decoder, expect for some minimal reuse. In the present application, most of the description related to peak rate or maximum data rate assumes its applicability to only the NR portion of the link. For example, if LTE offers 1 Gbps (Gigabits per second) and NR offers 1 Gbps, the UE's total peak data rate across LTE and NR is 2 Gbps, while its NR peak rate or simply peak rate can be 1 Gbps.

For NR dynamic transmission duration L, the maximum TBS in L symbols in numerology of $\mu$ (e.g. $\mu=0$ corresponds to 1 ms (millisecond) slot with 15 kHz (kiloHertz) SCS (subcarrier spacing), $\mu=1$ is 0.5 ms slot with 30 kHz SCS) can be given by:

$$TBS_{max} \leq (L/14)*\text{max DataRate}*1e\text{-}3*2^{-\mu}$$

There is a need to address two issues:
1. What potential overhead difference is possible between RAN2 (Radio Access Network 2), spec peak rate and L1 peak rate? RAN2 is a working group of 3GPP being responsible for the specification of the physical layer of the radio Interface for UE, UTRAN, Evolved UTRAN, and beyond; covering both FDD and TDD modes of the radio interface.
2. How to define L1 peak rate and association with TBS and transmission durations?
    a. How to reflect the scaling factor (SCF) from the PHY (Physical layer) perspective?

Overhead Analysis:

RAN1 has defined approximate peak rate based on average overheads for use in RAN2 spec (for L2 buffer calculation). RAN2 is a working group of 3GPP being responsible for radio Interface architecture and protocols (MAC (Media Access Control), RLC (Radio Link Control), PDCP (Packet Data Convergence Protocol)), the specification of the RRC (Radio Resource Control) protocol, the strategies of Radio Resource Management and the services provided by the physical layer to the upper layers.

If the same formula is used for defining the absolute L1 peak rate, there will be an overall loss because the overheads can be as large as 14% (for FR1, DL). For example, as shown below for 30 kHz SCS, the difference between the maximum TBS based on the formula from RAN2 (with OH (overhead)=14%) and that from TBS calculation (from RAN1 spec) is approximately 10%. One option is to change the overhead from 0.14 to 0.059 (recommended overhead) in RAN2 spec.

ing factor SCF=1, and 1024, the OH value that will enable the maximum TBS to be decodable (i.e. not exceed the maxDataRate*transmissionDuration) is given in Table 2.

In this example, we consider the PDSCH occupies the entire system BW and only DMRS overhead is considered.

TABLE 2

| | OH values | |
|---|---|---|
| | FR1 | FR2 |
| Only L = 14 duration | 0.059 | 0.062 |
| Only L = 2/4/7/14 durations | 0.037 | 0.04 |
| L = 2 to 14 symbols | 0.012 | 0.019 |

Considering data rate definition from only slots of 14 symbol duration, if the OH is adjusted to 0.059 in the formula applied in RAN2 specification, then the ensuing data rate could be considered as true or L1 data rate.

If transmissions of shorter duration (2/4/7/14) are considered while calculating the peak data rate, then the OH is adjusted to 0.037 in the formula applied in RAN2 specification.

Thus, embodiments are disclosed where the overhead value in peak rate calculation is adjusted to a value lower than 0.05. This can consider the variable time duration of transport block size transmission.

The overhead may be defined separately for downlink and uplink, and possibly for other links such as sidelink and/or access or backhaul links.

How to Reflect the Data Rate Constraint on the UE Side?

Figure 2:
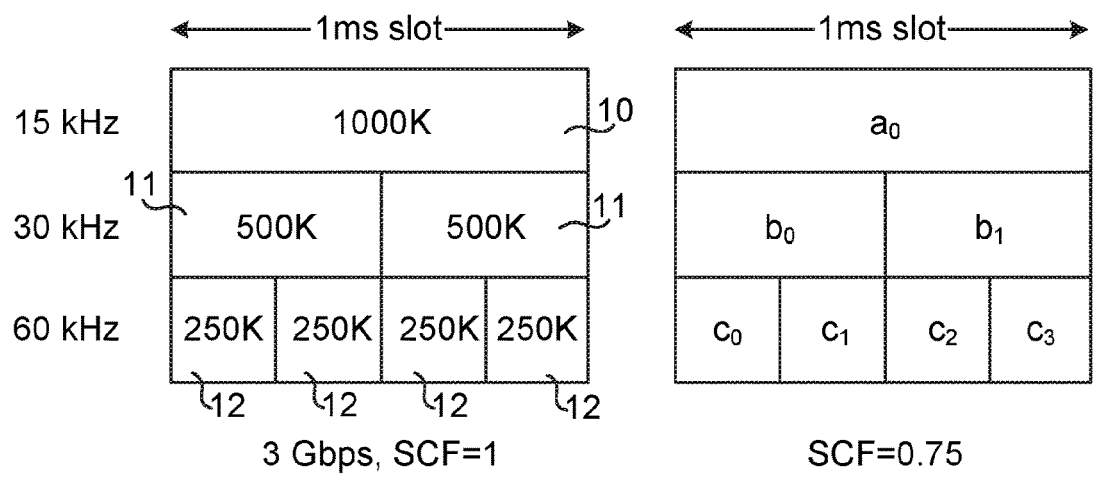
FIGS. 2-3 show schematic diagrams illustrating maximum TB limit for different carriers in CA case for different values of SCF.

Take the following illustrative example, as seen in the left-hand side of FIG. 2, where the UE has 3 carriers, and each carrier corresponds to a data rate of ~1 Gbps, and assume each carrier has a different numerology. A first carrier is made up by a single 1000 kbps component 10. A second carrier is made up by two 500 kbps components. A third carrier is made up by four 250 kbps components. Then the corresponding limits on the transport block size in each carrier is as shown in FIG. 2 (In practice, the carriers may have different data rates based on number of supported layers, bandwidth, Modulation order, etc.).

Now assume, as illustrated on the right hand side of FIG. 2, that UE reports a scaling factor (SCF) of 0.75 for each of the three carriers (which may be in same or different bands), which restricts the peak rate to 3×0.75=2.25 Gbps. Then how are constraints defined on TBS for the case of right-hand side of FIG. 2?

Depending on the PDCCH placement, DMRS for PDSCH (front-loaded or not), etc., for each of the carriers, the associated processing load on the decoder hardware may be different. However, the maximum TBS bits or some such constraint can be defined over a reference time interval suitably defined.

| FR | scs | nPRB | n_layers | Qm | TBS | slot | TBS data rate | Datarate (RAN2) | OH (RAN2) | recOH |
|---|---|---|---|---|---|---|---|---|---|---|
| FR1 | 1 | 273 | 2 | 8 | 638984 | 1.5 | 2.277968 | 2.1685 | 1.14 | 1.059 |
| FR1 | 1 | 273 | 4 | 8 | 1277992 | 0.5 | 2.555984 | 2.337 | 0.14 | 0.059 |

There are several cases to consider:

Single CC, SCF=1

Considering all SCS, 1/2/4 layers, type A and B DMRS (Demodulation reference signal) patterns, UE reported scal- The idea is to define a reference time interval such as reference slot duration and define a condition to be satisfied by a reference number of information bits within the reference time interval. The information bits can be the transport block bits (or sum thereof) or the code block bits (or sum thereof); the latter can take into account code-block group based transmissions, where an initial or a retransmission of transport block comprises only a portion of the transport block bits, and the receiver may be expected to perform physical layer decoding of only a portion of the transport block bits and hence can be a better indicator of the required decoder throughput. In certain embodiments, multiple reference time intervals may be defined and the corresponding conditions may be defined to reflect the effect of data rate. Some examples shown below:

Example 1: For single CC, with a numerology-$\mu$, the slot duration (in seconds) is given by $0.001*2^{-\mu}$, the reference slot duration is given by $0.001*2^{-\mu}$, and the reference number of information bits is given by
  Option 1: sum total of transport block bits scheduled with a single slot of the CC.
    Sum(TBS bits over the slot)<DataRate*SlotDuration
  Option 2: sum total of code block bits scheduled with a single slot of the CC.
    Sum(code blocks bits over the slot)<DataRate*SlotDuration Example 2: For multiple CCs, with a single numerology-$\mu$, the slot duration is given by $0.001*2^{-\mu}$, the reference slot duration can be given by $0.001*2^{-\mu}$, and the reference number of information bits can be given by
  Option 1: sum total of transport block bits scheduled with a single slot across the multiple carriers.
    Sum(TBS bits over the slot)<DataRate*SlotDuration
  Option 2: sum total of code block bits scheduled with a single slot across the multiple carriers.
    Sum(code blocks bits over the slot)<DataRate*SlotDuration Example 3: For multiple CCs, with different CCs on different numerologies ($\mu_0, \mu_1, \mu_2, \ldots \mu_{n-1}$) the slot durations are different for different carriers, the reference slot duration can be given by a reference numerology $\mu_{ref}$, and given by $0.001*2^{-\mu_{ref}}$, and the reference number of information bits is given by
  Option 1: sum total of transport block bits scheduled with a single slot across the multiple carriers.
    Sum(TBS bits over the reference slot duration) <DataRate*SlotDuration
  Option 2: sum total of code block bits scheduled with a single slot across the multiple carriers.
    Sum(code blocks bits over the reference slot duration)<DataRate*SlotDuration
  In this case, since there can be multiple overlapping slots of different durations, the information bits from different carrier may have be scaled suitably to determine the reference number of information bits
  Only one single reference slot duration may be defined or multiple reference slot durations may be defined.

With respect to FIG. 2, the reference $a_0$ denotes as the number of transport block bits (or code block bits) in the 1 ms slot duration for SCS of 15 kHz. This 1 ms slot overlaps two slots of 30 kHz SCS, and four slots of the 60 kHz SCS. Similarly, one slot of 30 KHz SCS overlaps two slots of 60 KHz.

The references $b_0$, $b_1$ denote a number of transport block bits (or code block bits) in the two slots for SCS of 30 kHz, respectively.

The references $c_0$, $c_1$, $c_2$, $c_3$ denote a number of transport block bits (or code block bits) in the four slots for SCS of 60 kHz, respectively.

For 1 ms reference interval: a condition on may be defined as follows:

$$a_0 + \sum_{n=0}^{1} b_n + \sum_{n=0}^{3} c_n \leq DataRate * 1 \text{ ms}$$

For 0.5 ms reference interval: a condition(s) on may be defined as follows:

$$\frac{a_0}{2} + b_0 + c_0 + c_1 \leq DataRate * 0.5 \text{ ms}$$
$$\frac{a_0}{2} + b_1 + c_2 + c_3 \leq DataRate * 0.5 \text{ ms}$$

where the scaling factor applied for TBS of a component carrier with numerology $\mu$ is $2^{\wedge}(\mu-\mu_{ref})$, when $\mu<=\mu_{ref}$ (e.g. for $\mu=0$ for 15 kHz, and $\mu_{ref}=1$ for 30 kHz=>Scaling for $\mu=0$ is 0.5)

For 0.25 ms reference interval: a condition(s) on may be defined as follows:
for (i,j) in $$\{(0,0), (0,1), (1,2), (1,3)\}: \frac{a_0}{4} + \frac{b_i}{2} + c_j \leq DataRate * 0.25 \text{ ms}$$

where the scaling factor applied for component carrier with numerology $\mu$ is $2^{\wedge}(\mu-\mu_{ref})$. e.g. for $\mu=0$ for 15 kHz, and $\mu_{ref}=2$ for 60 kHz=>Scaling for $\mu=0$ is 0.25, and for $\mu=1$ is 0.5.

More generally, if the UE is configured with one or more carriers with numerologies given by $\{\mu_0, \mu_1, \ldots, \mu_{N-1}\}$, if the reference numerology is $\mu_{ref}$, then the constraint may be given as follows:

$$\sum_{n=0}^{N-1} TBS_n * 2^{\mu_n - \mu_{ref}} \leq DataRate * 0.001 * 2^{-\mu_{ref}}$$

where $TBS_n$ denotes the transport block size scheduled on CC-n over a reference slot duration $0.001*2^{-\mu_{ref}}$, wherein if $\mu_n \leq \mu_{ref}$ the $TBS_n$ corresponds to the sum of the transport block sizes on CC-n on the slot that overlaps the reference slot duration, and if $\mu_n > \mu_{ref}$ the $TBS_n$ corresponds to the sum total of transport block sizes on CC-n on the slots that overlaps the reference slot duration.

Some additional embodiments are described below.

In certain embodiments, the conditions can be satisfied for all reference slot durations (among the configured CCs).

In certain embodiments, the conditions can be satisfied for a reference slot duration e.g. for FR1, 0.5 ms, and/or for FR1/FR2, the slot duration corresponding to the SCS associated with the data channel (for PDSCH, use SCS for downlink data channel, and for PUSCH, use SCS for the uplink data channel). The reference slot duration may be the shortest slot duration across all configured component carriers.

Note: FR1 refers to frequency range 1 or below 6 GHz, and FR2 refers to frequency range 2 or mmWave frequencies In certain embodiments, the conditions can be satisfied for a subset of reference slot durations e.g. for FR1, 1 and 0.5 ms, and/or for FR1/FR2, the slot duration corresponding to the SCS associated with the data channel (for PDSCH, use SCS for downlink data channel, and for PUSCH, use SCS for the uplink data channel).

In certain embodiments, the component carrier used for determining the reference slot duration can be based on one or more UE capabilities/configuration such as number of spatial layers supported, or a modulation scheme supported, receiver bandwidth etc. For instance, the carrier on which a back-loaded DMRS is configured.

In certain embodiments, the sum TBS is based on the bandwidth part information for a corresponding slot of a component carrier in determining the number of information bits or reference information bits.

In certain embodiments, the conditions can be applied per cell group. In dual connectivity, the conditions can be applied separately for each cell group.

In certain embodiments, the conditions can be applied per PUCCH cell group per cell group. In dual connectivity, the conditions can be applied separately per PUCCH cell group for each cell group.

In certain embodiments, the respective conditions are applied for carriers within a band in CA case e.g. the maximum data rate may be calculated on carriers per-band or there may be certain constraint such as a semi-static constraint on the data rate among carriers of different bands.

In certain embodiments, the respective conditions are applied for carrier within a cell group or within a PUCCH cell group e.g. the maximum data rate can be calculated on the carriers per-band using only the scaling factor applicable for that band.

In certain embodiments, the UE is capable of EN-DC or LTE-NR dual connectivity and/or is configured with LTE-NR dual connectivity, and the peak rate is the peak rate corresponding to the NR portion of LTE-NR dual connectivity and the carriers are the carriers associated with the NR cells.

In certain embodiments, the UE is capable of NR-NR DC (dual connectivity) and/or is configured with LTE-NR dual connectivity, and the peak rate is a peak rate corresponding to first NR macro cell group and the carriers are the carriers associated with the first NR primary cell group, and associated conditions applicable within the first cell group. The peak rate corresponding to the first NR cell group determined from the band/band-combination signaling associated with the first NR cell group.

the peak rate is a peak rate corresponding to NR secondary cell group and the carriers are the carriers associated with the NR secondary cell group, and associated conditions applicable within the secondary cell group. The peak rate corresponding to the NR secondary cell group determined from the band/band-combination signaling associated with the secondary cell group.

Example: NR-NR DC may have primary cell group corresponding to carriers in FR1, and a secondary cell group corresponding to carriers in FR2. A band/band combination for FR1 and FR2 can indicate support of NR-NR DC with MCG on FR1 and SCG on FR2 (or vice-versa).

In certain embodiments, the data rate is a maximum data rate based on the band/band combination signaling and configuration, which can be different or smaller than the peak rate which can be the maximum of the data rate computed based on a plurality of band/band combinations signaled by the UE.

In certain embodiments, the sum TBS is calculated based on those transport block or blocks whose transmission end within reference slot duration. In one example, the decoder processing (such as decoding operation) can begin only after the entire transmission of TB is received.

In certain embodiments, the sum TBS is calculated based on those code block or blocks whose transmission ends within reference slot duration. In one example, the decoder processing (such as decoding operation) can begin only after the entire transmission of code block or blocks is received.

The above approach can be generalized to any combination of transmissions durations on the carriers.

Figure 3:
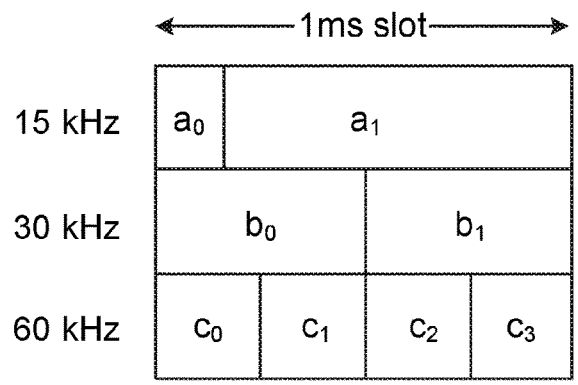

In certain embodiments, the conditions can be applied for a reference time interval defined in number of symbols. Consider following case, where a TB $a_0$ occupies a portion of the slot, illustrated in FIG. 3.

For this case, the reference time intervals can be defined as $L_0$ on which $a_0$ is transmitted, and as $L_1$ over which $a_1$ is transmitted. Then the condition can be defined as $a_0 + s_{b0}*b_0 + s_{c0}*c_0 <= DataRate*L_0$. In this case the scaling factors are defined suitably based on $L_0$ and time interval over which the corresponding overlapping transport blocks $b_0$ and $c_0$ are transmitted. The same principle can be applied for $a_1$ and so on.

If the condition is not satisfied (i.e. is exceeded), there are some different options for UE behavior:
1) UE may consider such a scheduling as an error case, and UE behavior is unspecified,
2) UE may skip decoding the transport block(s); if the UE skips decoding then it can indicate a NACK (negative acknowledgement) to the upper layers
   a. UE may or may not be able to store and soft combine received information
3) UE may process the transport block(s) partially, e.g. provide ACK (Acknowledgment) for the TBs or CBGs (Codeblock Group) that were processed and NACK for the unfinished blocks;
4) For uplink, the UE may not be able transmit since its transmission capability is exceeded, and hence may drop the transmission; if the different transmissions are scheduled by different PDCCHs occurring at different time instances, the UE may continue to transmit any ongoing transmissions, while dropping any transmissions that may cause UE transmission capability to be exceeded.

While the ideas are described primarily from an uplink or downlink perspective, the same ideas are applicable for sidelink, integrated access backhaul, and other forms of communication links in a cellular communication system.

An Example: TBS Restriction Based on a Peak Rate

An example of TBS restriction based on peak rate is shown below. While this example is shown for downlink, the same can be applied for uplink.

In serving cells belonging to a frequency range in a cell group, the UE is not required to handle any one of N overlapped or partially overlapped PDSCH transmissions not fulfilling the following condition at all points in time:

$$\sum_{j=1}^{N} \frac{C_j \cdot M_j}{D_j} \le DataRate$$

where, for the j-th PDSCH with subcarrier spacing $\mu$, $C_j$ is the number of scheduled code blocks as defined in section 5 of the 3GPP specification TS38.212.

$M_j$ is given by $K_0$ denoting the number of bits for code block number 0 defined in sub-clause 5.2.2 of section 5 of the 3GPP specification TS 38.212

$D_j = T_s^{\mu} \cdot L_j$, where $L_j$ denote the number of PDSCH symbols and $$T_s^{\mu} = \frac{10^{-3}}{2^{\mu} \cdot N_{symb}^{slot}}$$

DataRate is computed by the approximate data rate given by sub-clause 4.1.2 in section 13 of the 3GPP specification TS 38.306 for the frequency range in the cell group

More Details on Supporting Peak Rate in a Slot

Enhancement to the technique described in the example of TBS restriction described above is desirable, in particular to avoid scheduling restrictions when a PDSCH allocation is smaller than a slot length in duration. The same principle can be applied for uplink (PUSCH) or for other links.

The formulation above of data rate can be simplified to be applied per serving cell instead of per FR (Frequency Range) per cell group.

In an example, $L'_j = \min(L_j + \min(d, Delta), 14)$, where $L_j$ denotes the number of PDSCH symbols, $$T_s^{\mu} = \frac{10^{-3}}{2^{\mu} \cdot N_{symb}^{slot}}$$

In an example $L'_j = \min(L_j + d, 14)$

In an example, d is the number of symbols preceding the PDSCH in the slot that do not contain any PDSCH. In one further example preceding can mean immediately preceding.

For example, if a PDCCH is transmitted in symbols 0 and 1, and PDSCH is transmitted in symbols 2-13, then d=2.

For example, if a PDCCH is transmitted in symbols 0 and 1, and PDSCH-1 is transmitted in symbols 2-6, and PDSCH-1 is transmitted in symbols 6-13, then d=2 for PDSCH-1 and d=0 for PDSCH-2.

In an example, d can be the number of symbols in the slot that do not contain any PDSCH.

In an example, Delta can be a small value relative to the PDSCH duration $L_j$

In an example, Delta can take value of 1, 2 or 3.

In an example d=1, or 2 or 3.

In an example d can be a function of the number of symbols assigned for PDSCH. E.g. d=1 for $L_j \ge 7$ symbols, and d=0 for $L_j < 7$ symbols.

In another example $L'_j$ can be defined as $\min(L_j \cdot X, 14)$, where X is a scaling factor to adjust the TBS upwards and X can be 1.08 for $L_j \ge 7$ symbols, and X can be 1.0 for $L_j < 7$ symbols.

In table 3 below, different upper limits on TBS are shown in last three columns with the three different options. The assumptions in this table are shown below, which corresponds to 30 kHz SCS, 100 MHz channel BE, 4 layers, maximum of 256 QAM and 12 REs of overhead.

| scs | nPRB | n_layers | Qm | n_dmrs |
| --- | --- | --- | --- | --- |
| 1 | 273 | 4 | 6 | 12 |

The TBSplusCRC column shows the TBS that a physical layer in NR can allow, but which may or may not be schedulable if it exceeds the TBS_maxLimit. As can be seen the introduction of an enhancement as in with d=1, or with a scaling factor, will enable the TBS to be schedulable. For example with $L_j=13$, a TBS of 871104 is schedulable, if d=1 is applied (since 871104 is less than 876375) or with X=1.08 (since 871104 is less than 878879), but not with d=0 (because 871104 is NOT less than 813777).

TABLE 3 upper limits of TBS

| Lj | TBS | TBSplusCRC | txDuration_ms | dataRateFromF | TBS_maxLimit with d = 0 | TBS_maxLimit with d = 1 | TBS_maxLimit with X = 1.08 |
| --- | --- | --- | --- | --- | --- | --- | --- |
| 14 | 950984 | 953720 | 0.5 | 1.75275 | 876375 | 876375 | 876375 |
| 13 | 868584 | 871104 | 0.464286 | 1.75275 | 813777 | 876375 | 878879 |
| 12 | 803304 | 805632 | 0.428571 | 1.75275 | 751179 | 813777 | 811273 |
| 11 | 721000 | 723088 | 0.392857 | 1.75275 | 688580 | 751179 | 743667 |
| 10 | 655800 | 657696 | 0.357143 | 1.75275 | 625982 | 688580 | 676061 |
| 9 | 590128 | 591856 | 0.321429 | 1.75275 | 563384 | 625982 | 608455 |
| 8 | 507984 | 509472 | 0.285714 | 1.75275 | 500786 | 563384 | 540849 |
| 7 | 434280 | 435552 | 0.25 | 1.75275 | 438188 | 500786 | 473243 |
| 6 | 360488 | 361544 | 0.214286 | 1.75275 | 375589 | 438188 | 405636 |
| 5 | 295176 | 296064 | 0.178571 | 1.75275 | 312991 | 375589 | 338030 |
| 4 | 217128 | 217776 | 0.142857 | 1.75275 | 250393 | 312991 | 270424 |
| 3 | 147576 | 148032 | 0.107143 | 1.75275 | 187795 | 250393 | 202818 |
| 2 | 73776 | 74016 | 0.071429 | 1.75275 | 125196 | 187795 | 135212 |

Details of Embodiments Including MCS (Modulation and Coding Scheme)-Level Based Restriction Associated with Peak Rates Data rate sharing has been explained in previous sections. One aspect to consider in case of data rate sharing across multiple carriers, is potential for extreme load (when all the data rate is concentrated) on one carrier. This could become a severe issue if UE indicated different capabilities with respect to processing times on different carriers.

Assume a 3 carrier CA case, and each carrier's capacity is 1 Gbps, which could be derived from maximum TBS divided by corresponding slot duration assuming maximum RB allocation (e.g. =273 for 100 MHz @30 kHz SCS), maximum spectral efficiency based on maximum rate (e.g. 0.935) and maximum modulation order (e.g. =8 in case of 256 QAM), maximum number of layers (e.g. 4 for 4-layer MIMO), and data rate scaling factor f=1 for simplicity.

Figure 4:
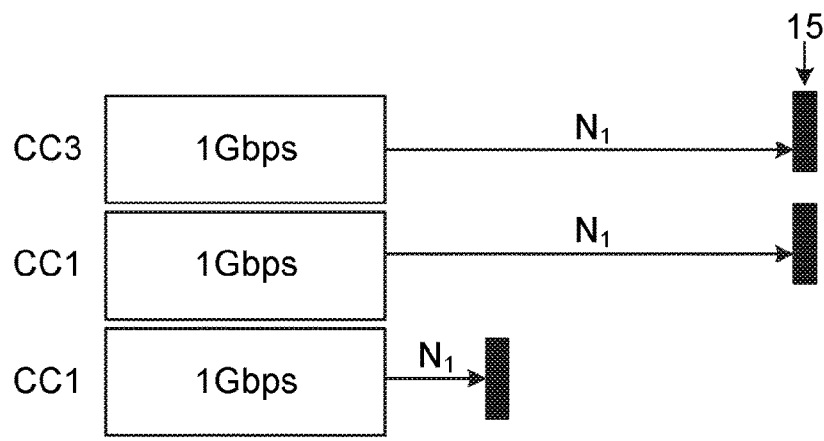
FIG. 4 is a schematic diagram illustrating ACK processing time for three carriers in a first scenario.

FIG. 4 shows the case of ACK processing time ($N_1$ or $N_1'$ for different capabilities). FIG. 4 shows the data rate on each carrier, in case of no data rate sharing. From UE capability report, the UE can indicate a mix of Cap #1 and Cap #2 processing time support for different carriers in CA case. In FIG. 4, note the CC1 has to processing 1 Gbps @ $N_1'$ processing time. N1, N1' are different timelines for processing times based on cap #1 and cap #2

Figure 5:
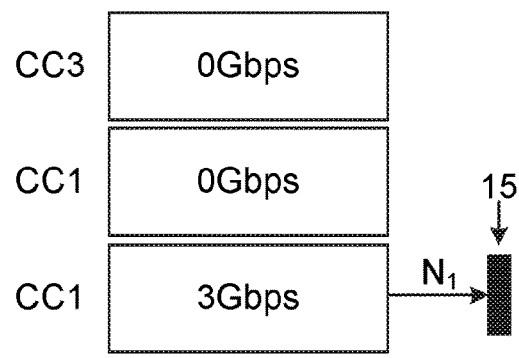
FIG. 5 is a schematic diagram illustrating ACK processing time for three carriers in a second scenario.

Now looking to FIG. 5, consider the case of data rate sharing amongst the three carriers, where the situation showed as in FIG. 5 could occur.

In the situation of FIG. 5, it can happen that the data rate from the two carriers (CC2 and CC3) is pushed towards the CC1 carrier, and hence there could be a requirement for the CC1 to process a load of 3 Gbps @ $N_1'$, which could be quite excessive.

The scenario in FIG. 5 is not desirable it requires three times data rate to be delivered at very short processing time.

We look at the cases where the above can occur, using the following example table from 3GPP specification. Following is an example MCS table, Table 5.1.3.1-1 of the 3GPP specification TS38.214 which can be used for TBS determination when maximum modulation order is 64-QAM

TABLE 4

MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

Identification of Cases Where 3 Gbps can Occur:
  Case 1: For MCS where UE Explicitly Determines TBS is Based on MCS, RB Allocation, DMRS Overhead
    =>TB scales proportionally with assigned #symbols (number of symbols), and max Spectral efficiency is capped. In this case where the TBS is determined from MCS, it is typically upper-bounded by Rmax×Modulation Order (e.g. code rate=0.935×64QAM) from gNB (next generation node B) configuration for the carrier.
    =>3 Gbps will not occur as TBS/duration will yield a value less than or equal to 1 Gbps.
    =>in the example table, MCS0-28 fall under this case
  Case 2: For MCS where UE Implicitly Determines TBS Independently from the Assigned Modulation Order and Resource Allocation (Retx)=
    =>TB is not always proportional to assigned #symbols, and hence the effective spectral efficiency is NOT typically upper-bounded by Rmax×Modulation Order (e.g. code rate=0.935×64QAM)
    =>3 Gbps can occur, and hence this should be addressed
    =>in the example table, for MCS29, 30, 31 fall under this case One way to resolve this problem is by applying a restriction that can address case 2 problematic cases.
  Solution:
    For implicit MCS based TBS scheduling (e.g. only for MCS29/30/31 for 64QAM case), any one of following restriction can be applied:
      Alt 1: scheduledTBS<=DataRate*durationPDSCH
        Data rate can be per-CC Data rate e.g. DataRatePerCC
        Can include scaling factor f
        Data rate can be per-CC data rate derived from UE band/band-combination signaling (can include the scaling factor)
        Data rate can be derived from UE carrier configuration (max BW, max MCS, #layers, etc.) signaling
      Alt 2: scheduledTBS<=durationPDSCH*TBS_LBRM/14.
    The above can be applied on a per-CC basis, and can be applied in addition to any data rate sharing
    There is a scheduling restriction of course, but impact is quite limited (e.g. only for MCS29/30/31 for 64QAM case).
    The above solution can be applied for all cases, even Cap #1-only cases.
More Details of Embodiments
  A TBS restriction is applied for certain subset of MCS levels for a serving cell or a carrier.
  A TBS restriction applied for certain subset of MCS levels for a serving cell or a carrier can be a second TBS restriction.

A first TBS restriction can be applied for a different subset of MCS levels for one or more serving cells (e.g. subset can include all MCS levels). First TBS restriction can be as described in the example TBS restriction based on a peak rate above. Second TBS restriction can be as described for the MCS-level based restriction associated with peak rates above.

The MCS levels can correspond to MCS associated with "reserved" label in the Target Code Rate/Spectral efficiency in the MCS table for the serving cell or the carrier.

The MCS levels can be a subset of allowed MCS levels, i.e. less than all possible MCS levels.

The TBS restriction can be dependent on data rate for the serving cell or the carrier, and the assigned duration of the shared channel (PDSCH or PUSCH). In an example, the scheduledTBS<=DataRate*durationSCH, where Data rate is a data rate for a carrier, and durationSCH is the time duration for the SCH transmission (e.g. derived from the PDSCH/PUSCH resource allocation in time and numerology and a reference symbol duration).

The TBS restriction can come from the maximum TBS schedulable with the durationSCH with a reference MCS. E.g. the reference MCS can be MCS28.

The TBS restriction can be dependent on TBS_LBRM calculated for the serving cell or the carrier, and the assigned duration of the shared channel (PDSCH or PUSCH). In one example, scheduledTBS<=symbolsSCH*TBS_LBRM/NumSymbolsPerSlot, where symbolsSCH is the number of assigned symbols for SCH (e.g. derived from the PDSCH/PUSCH resource allocation in time), and NumSymbolsPerSlot is the number of symbols in a slot, and TBS_LBRM is a reference transport block size.

The TBS restriction can be dependent on a scaling factor and a TBS_LBRM calculated for the serving cell or the carrier, and the assigned duration of the shared channel (PDSCH or PUSCH).

The scaling factor can be a scaling factor dependent on the active BWP, and at least one more BWP (e.g. a BWP configured for the UE corresponding a maximum number of RBs).

The restriction can be applied for uplink and/or for downlink and/or sidelink.

Figure 6:
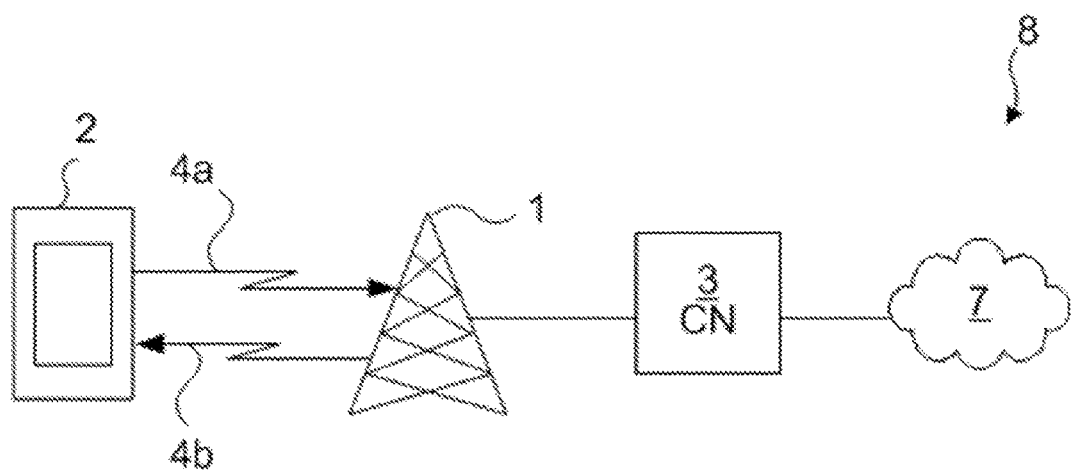
FIG. 6 is a schematic diagram illustrating a cellular communication network where embodiments presented herein may be applied.

FIG. 6 is a schematic diagram illustrating a cellular communication network 8 where embodiments presented herein may be applied. The cellular communication network 8 comprises a core network 3 and one or more base stations 1, here in the form of base stations being evolved Node Bs, also known as eNode Bs or eNBs. The base station 1 could also be in the form of g Node Bs, Node Bs, BTSs (Base Transceiver Stations) and/or BSSs (Base Station Subsystems), etc. The base station 1 can be implemented at one location or can be split over several locations. For instance, part of the processing of the base station 1 can be performed in a central location, also known as the cloud. In such a case, the processing in the central location can be performed in a physical device which performs processing for several base stations 1.

The base station 1 provides radio connectivity over a wireless interface 4a-b to a plurality of UEs 2. The term UE is also known as mobile communication terminal, mobile terminal, user terminal, user agent, wireless terminal, machine-to-machine device etc., and can be, for example, what today are commonly known as a mobile phone, smart phone, Internet of Things (IoT) device, or a tablet/laptop with wireless connectivity.

The cellular communication network 8 may e.g. comply with any one or a combination of 5G NR (New Radio), LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication 4b occurs from the base station 1 to the wireless device 2 and uplink (UL) communication 4a occurs from the wireless device 2 to the base station 1. The quality of the wireless radio interface for each wireless device 2 can vary over time and depends on the position of the wireless device 2, due to effects such as fading, multipath propagation, interference, etc.

The base station 1 is also connected to the core network 3 for connectivity to central functions and a wide area network 7, such as the Internet. The base station is a network entity in the cellular communication network 8. Moreover, the core network 3 can comprise one or more network entities. Also the UEs 2 can be considered to be network entities.

The embodiments presented herein can be performed in any suitable network entity. In one embodiment, the embodiments presented herein are performed in a network entity that performs scheduling, e.g. the base station 1.

Figure 7:
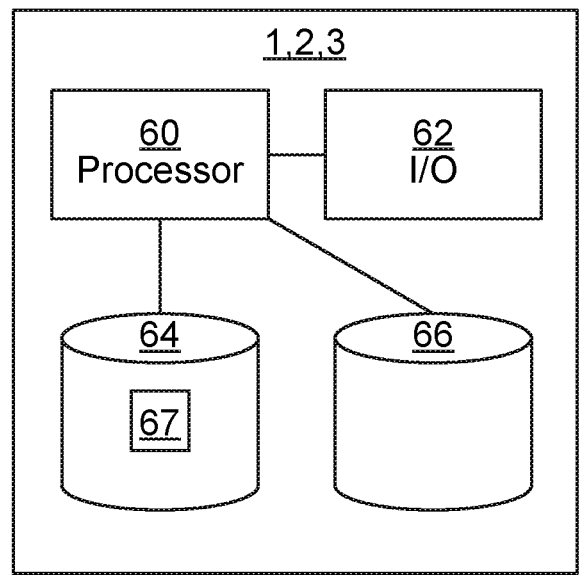
FIG. 7 is a schematic diagram illustrating components of the base station of FIG. 6.

FIG. 7 is a schematic diagram illustrating components of the network entities, i.e. base station 1, wireless device 2 and devices of the core network 3 of FIG. 6. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute any one of the methods described herein.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities.

Other components are omitted in order not to obscure the concepts presented herein.

Figure 8:
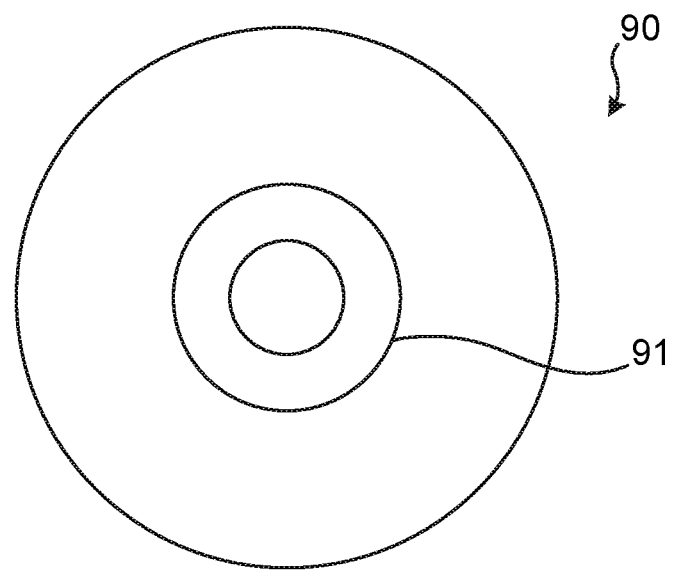
FIG. 8 shows one example of a computer program product comprising computer readable means.

FIG. 8 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 7. While the computer program 91 is here schematically shown as a track on the depicted optical disk, the computer program can be stored in any way which is suitable for the computer program product, such as a removable solid-state memory, e.g. a Universal Serial Bus (USB) drive.

Figure 9:
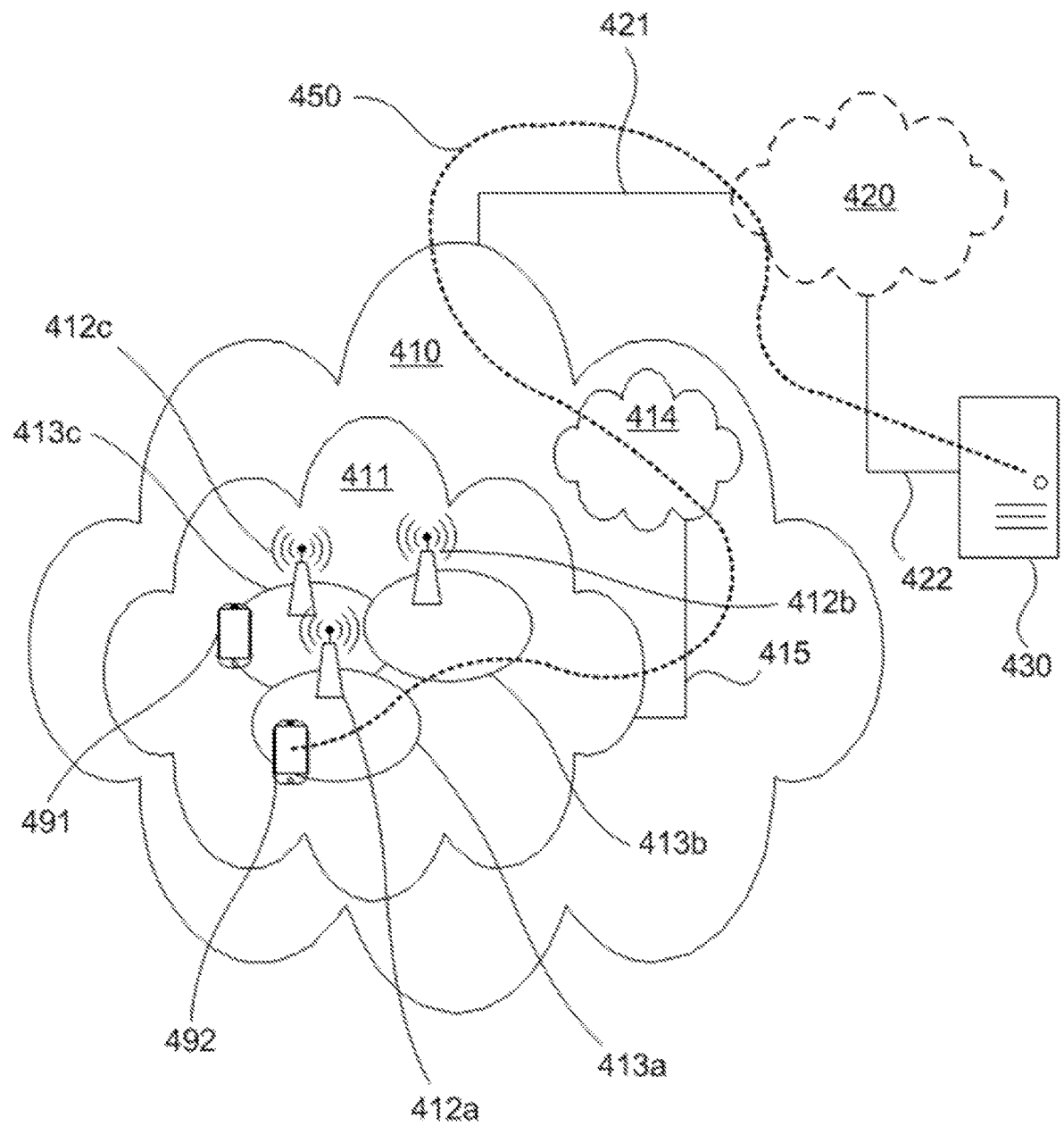
FIG. 9 is a schematic diagram illustrating a telecommunication network connected via an intermediate network to a host computer in accordance with some embodiments.

FIG. 9 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
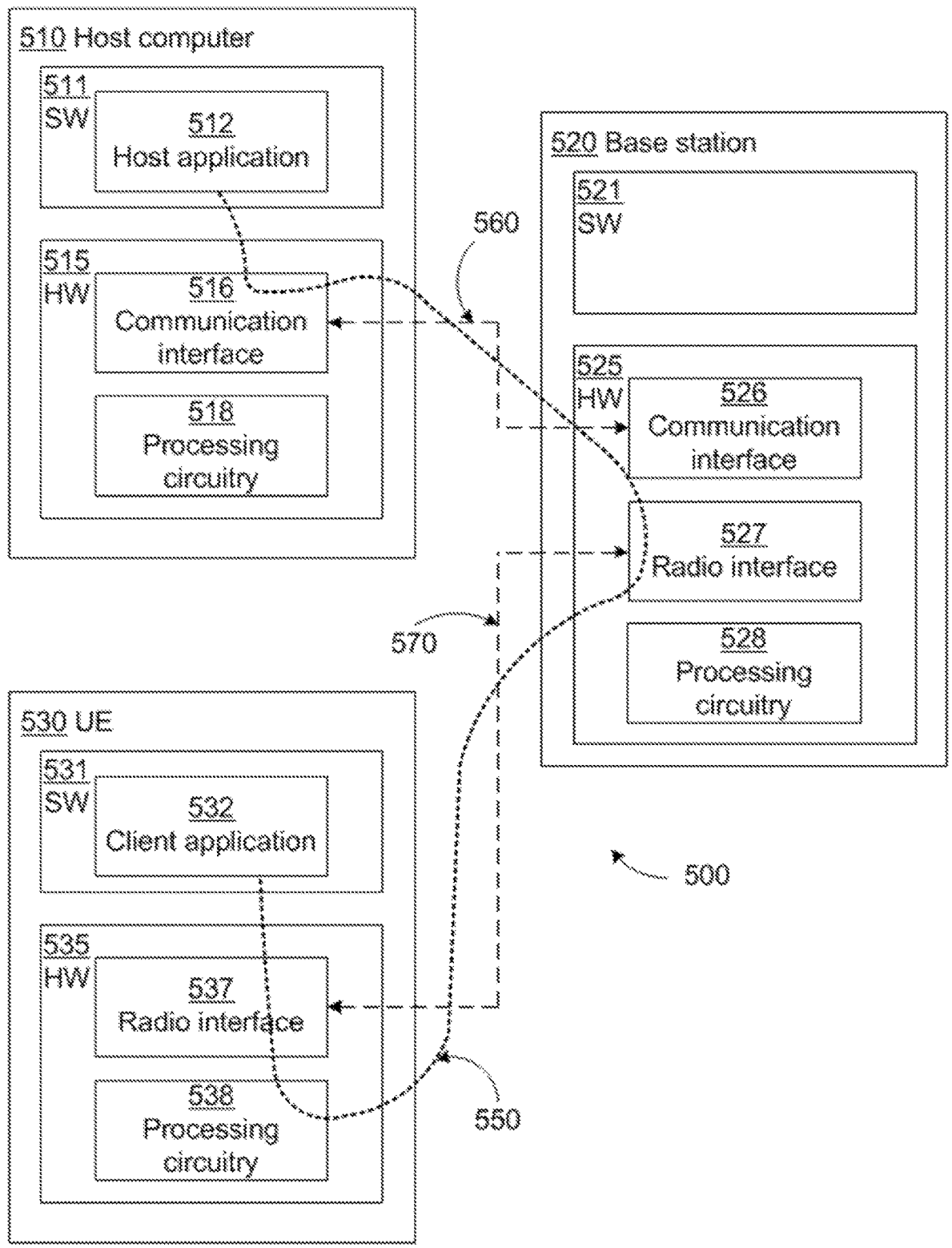
FIG. 10 is a schematic diagram illustrating host computer communicating via a base station with a UE over a partially wireless connection in accordance with some embodiments.

FIG. 10 is a schematic diagram illustrating host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the way peak data rates are managed.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Figure 13:
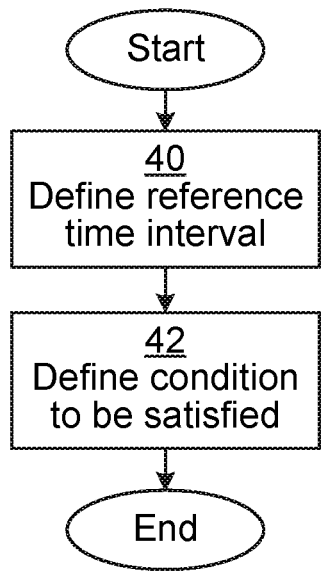
FIG. 13 is a flowchart schematically illustrating embodiments of the method in the network entity.

FIG. 13 is a flowchart schematically illustrating embodiments of the method in the network entity.

In a define reference time interval step 40, the network entity defines a reference time interval.

In a define condition to be satisfied step 42, the network entity defines a condition to be satisfied by a reference number of information bits within the reference time interval.

Further details of the steps 40, 42 of this method are described above.

The invention has mainly been described above with reference to a few embodiments. However, as is readily appreciated by a person skilled in the art, other embodiments than the ones disclosed above are equally possible within the scope of the invention.

Figure 14:
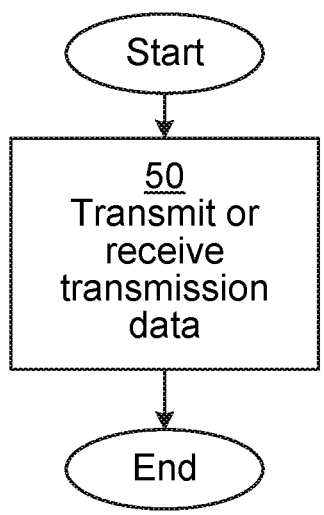
FIG. 14 is a flow chart illustrating embodiments of methods performed in a network entity.

FIG. 14 is a flow chart illustrating embodiments of methods performed in a network entity. This method can be applied Case 2 mentioned above, for MCS where UE implicitly determines TBS independently from the assigned modulation order and Resource allocation (retx). This method can be applied for uplink communication and/or downlink communication.

In a transmit or receive transmission data step 50, the network entity transmits or receives transmission data. The transmission is scheduled with an MCS level indicated by an MCS index ($I_{MCS}$). The transmitting or receiving is based on a first condition being used for a first subset of MCS levels being a subset of all possible MCS levels.

The first subset of MCS levels may consist of those for which an associated target code rate is reserved.

The first subset of MCS levels may correspond to MCS levels associated with a "reserved" label in an MCS index table in section 5.1.3.1 of the 3GPP specification TS 38.214 (see e.g. Table 4 above). The first subset of MCS levels can contain MCS levels with an $I_{MCS}$ being one of 29, 30 or 31 when 64 QAM, Quadrature Amplitude Modulation, is applied.

The network entity can be a UE. Alternatively, the network entity can be a base station.

A TBS restriction can be applied for a second subset of MCS levels for one or more serving cells. It is to be noted that the second subset can include all MCS levels.

A second condition being used for the second subset can result in a first restriction of transport block size and the first condition can result in a second restriction of transport block size.

The second restriction of transport block size can be defined by:

scheduledTBS<=DataRate*durationSCH where scheduledTBS is a scheduled transport block size, DataRate is data rate of a carrier and durationSCH is an assigned duration of the downlink or uplink shared channel.

The duration SCH can be calculated according to:

$T_s^\mu \cdot L_j$, where $L_j$ denotes the number of shared channel symbols and $$T_s^\mu = \frac{10^{-3}}{2^\mu \cdot N_{symb}^{slot}},$$

where μ denoted numerology and $N_{symb}^{slot}$ denotes number of symbols per slot.

The data rate can be a per component carrier. The data rate can be derived from UE band/band-combination signaling. The data rate can also include a scaling factor.

The first restriction can define a peak data rate over which the UE is not required to handle transmissions. For instance, as described above, the UE is not required to handle any one of N overlapped or partially overlapped PDSCH transmissions not fulfilling the following condition at all points in time:

$$\sum_{j=1}^{N} \frac{C_j \cdot M_j}{D_j} \leq DataRate$$

where, for the j-th PDSCH with subcarrier spacing μ, $C_j$ is the number of scheduled code blocks as defined in section 5 of the 3GPP specification TS38.212.

$M_j$ is given by $K_0$ denoting the number of bits for code block number 0 defined in sub-clause 5.2.2 of section 5 of the 3GPP specification TS 38.212

$D_j = T_s^\mu \cdot L_j$, where $L_j$ denote the number of PDSCH symbols and $$T_s^\mu = \frac{10^{-3}}{2^\mu \cdot N_{symb}^{slot}}$$

DataRate is computed by the approximate data rate given by sub-clause 4.1.2 in section 13 of the 3GPP specification TS 38.306 for the frequency range in the cell group.

Figure 15:
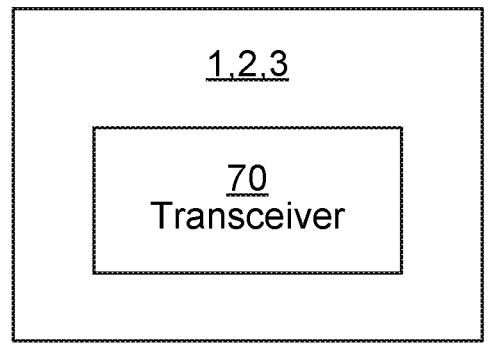
FIG. 15 is a schematic diagram showing functional modules of the network entity of FIG. 6 according to one embodiment.

FIG. 15 is a schematic diagram showing functional modules of the network entity 1, 2, 3 of FIG. 6 according to one embodiment. The modules are implemented using software instructions such as a computer program executing in the network entity. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 14.

A transceiver 70 corresponds to step 50.

Here now follows a set of enumerated items representing various embodiments.

1. A method performed in a network entity, the method comprising the steps of:
    defining a reference time interval; and
    defining a condition to be satisfied by a reference number of information bits within the reference time interval.
2. The method according to item 1, wherein the information bits comprise transport block bits.
3. The method according to item 1 or 2, wherein the information bits comprise code block bits.
4. The method according to any one of the preceding items, wherein the reference time interval depends on a reference numerology.
5. The method according to any one of the preceding items, wherein a component carrier used for determining the reference time interval is based on one or more UE capabilities and/or US configurations, such as number of spatial layers supported, supported modulation scheme(s), receiver bandwidth etc.
6. The method according to any one of the preceding items, wherein the step of defining a condition to be satisfied, the condition is defined according to:

$$\sum_{n=0}^{N-1} TBS_n * 2^{\mu_n - \mu_{ref}} \leq DataRate * 0.001 * 2^{-\mu_{ref}}$$

where N denotes number of component carriers, μ denotes numerology, TBS denotes transport block size, and DataRate denotes data rate.

7. The method according to any one of the preceding items, wherein the condition is found satisfied for all possible reference slot duration of component carriers of an associated scheduled transmission.
8. A network entity comprising:
    a processor (60); and
    a memory (64) storing instructions (67) that, when executed by the processor, cause the network entity to:
    define a reference time interval; and
    define a condition to be satisfied by a reference number of information bits within the reference time interval.
9. The network entity according to item 8, wherein the information bits comprise transport block bits.
10. The network entity according to item 8 or 9, wherein the information bits comprise code block bits.
11. The network entity according to any one of items 8 to 10, wherein the reference time interval depends on a reference numerology.
12. The network entity according to any one of items 8 to 11, wherein a component carrier used for determining the reference time interval is based on one or more UE capabilities and/or US configurations, such as number of spatial layers supported, supported modulation scheme(s), receiver bandwidth etc.
13. The network entity according to any one of items 8 to 12, wherein the instructions to define a condition to be satisfied comprise instructions (67) that, when executed by the processor, cause the network entity to define the condition according to:

$$\sum_{n=0}^{N-1} TBS_n * 2^{\mu_n - \mu_{ref}} \leq DataRate * 0.001 * 2^{-\mu_{ref}}$$

where N denotes number of component carriers, μ denotes numerology, TBS denotes transport block size, and DataRate denotes data rate.

14. The network entity according to any one of items 8 to 13, wherein the condition is found satisfied for all possible reference slot duration of component carriers of an associated scheduled transmission.

15. A network entity comprising:
means for defining a reference time interval; and
means for defining a condition to be satisfied by a reference number of information bits within the reference time interval.

16. The network entity according to any one of items 8 to 15, wherein the network entity is a base station 17. The network entity according to item 16, wherein the network entity is a gNode B.

18. A computer program (67, 91), the computer program comprising computer program code which, when run on a network entity causes the network entity to:
define a reference time interval; and
define a condition to be satisfied by a reference number of information bits within the reference time interval.

19. A computer program product (64, 90) comprising a computer program according to item 18 and a computer readable means on which the computer program is stored.

20. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
define a reference time interval; and
define a condition to be satisfied by a reference number of information bits within the reference time interval.

21. The communication system of item 20, further including the base station.

22. The communication system of item 21, further including the UE, wherein the UE is configured to communicate with the base station.

23. The communication system of item 22, wherein:
the processing circuitry of the host computer is configured to execute a host application, thereby providing the user data; and
the UE comprises processing circuitry configured to execute a client application associated with the host application.

24. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station:
defines a reference time interval; and
defines a condition to be satisfied by a reference number of information bits within the reference time interval.

25. The method of item 24, further comprising:
at the base station, transmitting the user data.

26. The method of item 25, wherein the user data is provided at the host computer by executing a host application, the method further comprising:
at the UE, executing a client application associated with the host application.

The invention claimed is:

1. A method performed by a network entity, the method comprising:
one of transmitting and receiving a transmission of data, the transmission being scheduled with a Modulation and Coding Scheme, MCS, level indicated by an MCS index, $I_{MCS}$, and having an assigned modulation order and resource allocation, and the one of the transmitting and receiving being based on a first restriction of a transport block size being used for a first subset of MCS levels being a subset of all possible MCS levels for which the transport block size is determined independently of the assigned modulation order and resource allocation.

2. The method according to claim 1, wherein the first subset of MCS levels consists of those for which an associated target code rate is reserved.

3. The method according to claim 1, wherein the first subset of MCS levels correspond to MCS levels associated with a "reserved" label in an MCS index table in section 5.1.3.1 of the 3GPP specification TS 38.214.

4. The method according to claim 1, wherein the first subset of MCS levels contain MCS levels with an $I_{MCS}$ being one of 29, 30 and 31 when 64 QAM, Quadrature Amplitude Modulation, is applied.

5. The method according to claim 1, wherein the network entity is a user equipment, UE.

6. The method according to claim 1, wherein the first restriction restricts the transport block size to be equal to or less than
DataRate*durationSCH,
where DataRate is a data rate of a carrier and durationSCH is an assigned duration of a downlink or uplink shared channel.

7. The method according to claim 6, wherein the duration SCH is calculated according to:
$T_s^\mu \cdot L_j$, where $L_j$ denotes the number of shared channel symbols and $$T_s^\mu = \frac{10^{-3}}{2^\mu \cdot N_{symb}^{slot}},$$

where μ denoted numerology and $N_{symb}^{slot}$ denotes number of symbols per slot.

8. The method according to claim 6, wherein the data rate is a data rate per component carrier.

9. The method according to claim 8, wherein the data rate is derived from UE band/band-combination signaling.

10. The method according to claim 8, wherein the data rate includes a scaling factor.

11. The method according to claim 1, wherein a second restriction of transport block size, TBS, is applied for a second subset of MCS levels for one or more serving cells.

12. The method according to claim 11, wherein the second subset can include all MCS levels.

13. The method according to claim 11, wherein the first restriction defines a peak data rate over which the UE is not required to handle transmissions.

14. A network entity comprising:
a processor; and
a memory storing instructions that, when executed by the processor, cause the network entity to:
one of transmit and receive a transmission of data, the transmission being scheduled with a Modulation and Coding Scheme, MCS, level indicated by an MCS index, $I_{MCS}$, and having an assigned modulation order and resource allocation, and the one of the transmitting and receiving being based on a first restriction of a transport block size being used for a first subset of MCS levels being a subset of all possible MCS levels for which the transport block size is determined independently of the assigned modulation order and resource allocation.

15. The network entity according to claim 14, wherein the first subset of MCS levels consists of those for which an associated target code rate is reserved.

16. The network entity according to claim 14, wherein the first subset of MCS levels correspond to MCS levels associated with a "reserved" label in an MCS index table in section 5.1.3.1 of the 3GPP specification TS 38.214.

17. The network entity according to claim 14, wherein the first subset of MCS levels contain MCS levels with an $I_{MCS}$ being one of 29, 30 or 31 when 64 QAM, Quadrature Amplitude Modulation, is applied.

18. The network entity according to claim 14, wherein the network entity is a user equipment, UE.

19. The network entity according to claim 14, wherein the first restriction restricts the transport block size to be equal to or less than
DataRate*durationSCH,
where DataRate is a data rate of a carrier and durationSCH is an assigned duration of a downlink or uplink shared channel.

20. The network entity according to claim 19, wherein the duration SCH is calculated according to:

$T_s^\mu \cdot L_j$, where $L_j$ denotes the number of shared channel symbols and $$T_s^\mu = \frac{10^{-3}}{2^\mu \cdot N_{symb}^{slot}},$$

where μ denoted numerology and $N_{symb}^{slot}$ denotes number of symbols per slot.

21. The network entity according to claim 19, wherein the data rate is a data rate per component carrier.

22. The network entity according to claim 21, wherein the data rate is derived from UE band/band-combination signaling.

23. The network entity according to claim 21, wherein the data rate includes a scaling factor.

24. A non-transitory computer storage medium storing a computer program comprising computer program code which, when run on a network entity causes the network entity to:
one of transmit and receive a transmission of data, the transmission being scheduled with a Modulation and Coding Scheme, MCS, level indicated by an MCS index, $I_{MCS}$, and having an assigned modulation order and resource allocation, and the one of the transmitting receiving being based on a first restriction of a transport block size being used for a first subset of MCS levels being a subset of all possible MCS levels for which the transport block size is determined independently of the assigned modulation order and resource allocation.

* * * * *